July 20, 1937.    L. J. PETERS    2,087,702
METHOD AND MEANS FOR RECORDING TERRESTRIAL WAVES
Filed Oct. 17, 1934    2 Sheets-Sheet 1
*Fig. 1.*
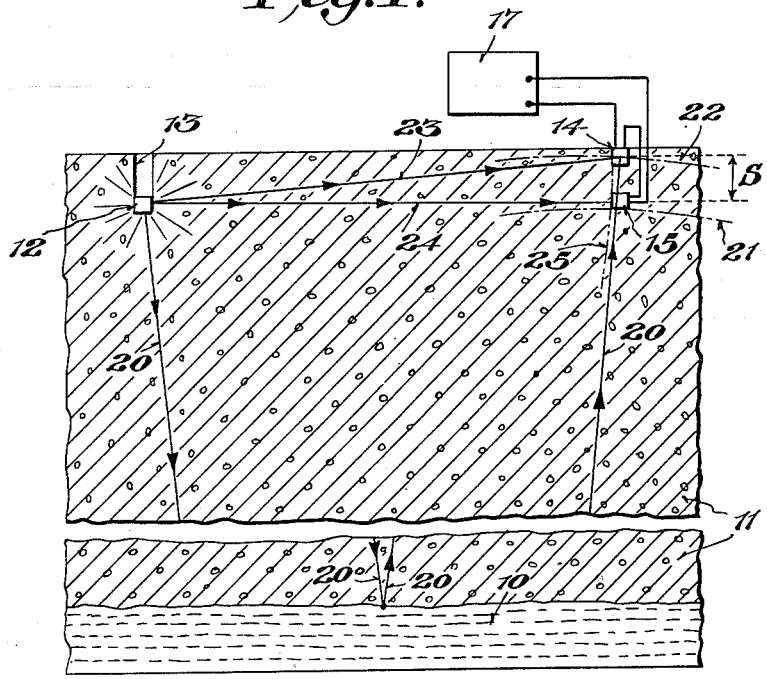
*Fig. 2.*
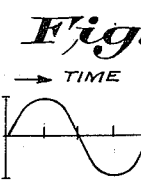
*Fig. 3.*
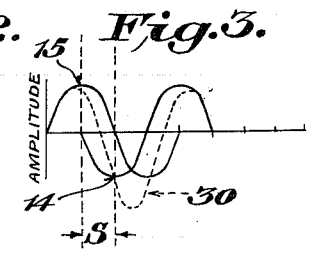
*Fig. 4.*
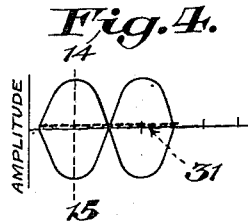
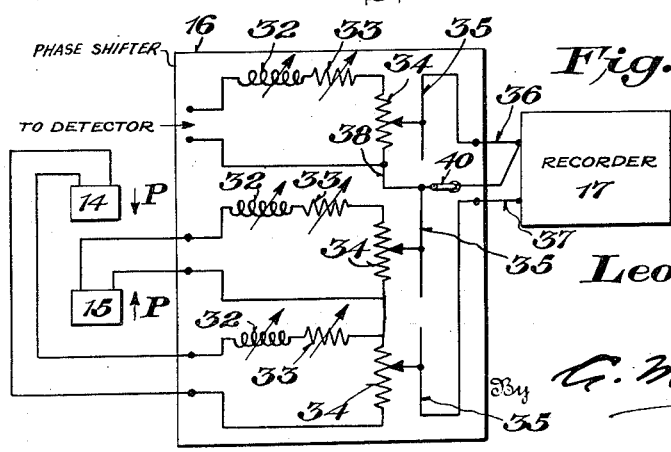
*Fig. 5.*
Inventor
Leo J. Peters,
By G. M. Houghton
his Attorney July 20, 1937.   L. J. PETERS   2,087,702
METHOD AND MEANS FOR RECORDING TERRESTRIAL WAVES
Filed Oct. 17, 1934   2 Sheets—Sheet 2
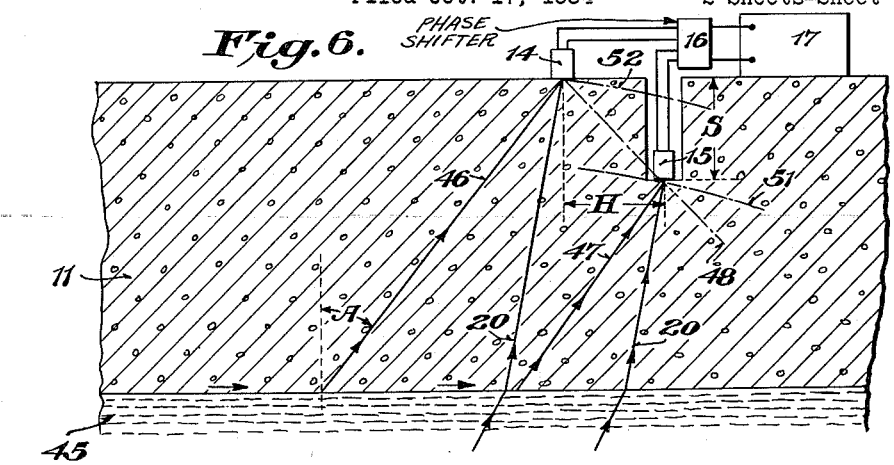
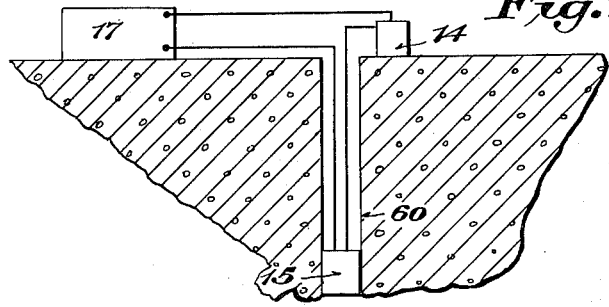
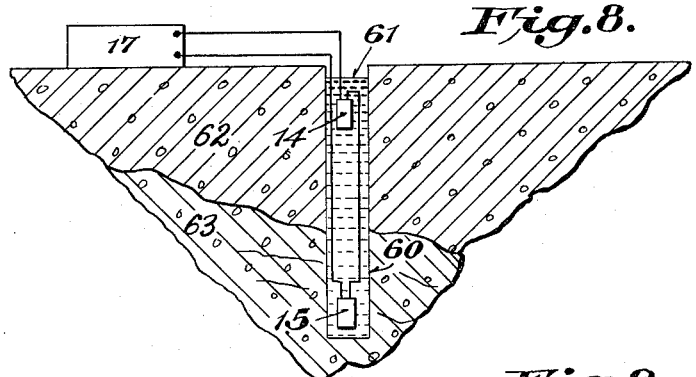
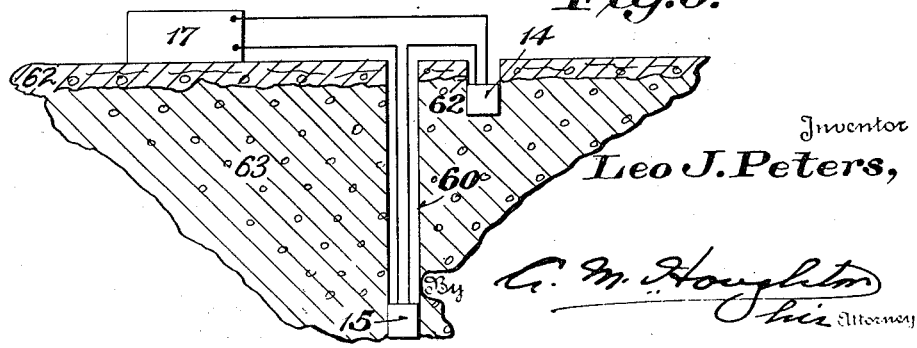
Inventor
Leo J. Peters, Patented July 20, 1937

2,087,702

UNITED STATES PATENT OFFICE 2,087,702

METHOD AND MEANS FOR RECORDING TERRESTRIAL WAVES

Leo J. Peters, Pittsburgh, Pa., assignor to Gulf Research & Development Company, Pittsburgh, Pa., a corporation of Delaware Application October 17, 1934, Serial No. 748,769

9 Claims. (Cl. 177—352)

This invention relates to methods and means for recording terrestrial waves; and it comprises in geophysical prospecting methods wherein a source of terrestrial wave vibrations is set up and the waves are recorded after passage through underlying strata, the improvement which comprises providing a plurality of electrical detecting elements spaced vertically with relation to each other and so interconnected electrically in relative phase difference that the detection and recording of terrestrial waves which it is not desired to record is minimized, whatever their frequency; and it further comprises as a new organization of apparatus elements for detecting and recording certain desired terrestrial wave vibrations while suppressing disturbing vibrations, a plurality of detector elements spaced in the ground vertically and sometimes horizontally as well and connected in phase difference, and means for recording the waves as received by the detectors, the apparatus sometimes having in addition phase shifting means between the detectors and the recorder for varying the relative phase difference of the detectors, the apparatus being set up at a spaced distance from a source of terrestrial vibration and the spacing of the detector elements being such that undesired, disturbing waves of all frequencies reach them from the source at approximately the same time and desired waves reach them one after the other; all as more fully hereinafter set forth and as claimed.

In seismological prospecting methods a source of terrestrial waves is set up and waves are received and recorded at a distant point. The source is sometimes an exploding charge of dynamite. Sometimes a source of continuous elastic waves is used such as a vibrator. Waves are spread out in all directions from the source and are reflected and refracted at various sub-surface strata. Some distance from the source is placed one or more seismographs or other type of recorder adapted to receive and record terrestrial waves after their passage through the earth. From records of the received waves inferences can be drawn as to the sub-surface geological structure.

As stated, waves are propagated from the source in all directions. Each wave or vibration proceeds from the source through the earth as a sort of rapidly expanding shell-like surface or front—the wave front—roughly analogous to one of the expanding rings set up when a stone is thrown in water. All points on this front represent equal traveling times from the source. At any given point in the earth spaced from the source, the wave front in which the point lies is called an equal travel time surface. In a homogeneous isotropic medium waves spread out radially and the wave front or equal travel time surface is spherical. The earth's crust, however, is in general neither homogeneous nor isotropic, hence the wave front of a traveling wave is not ordinarily spherical but is a complicated surface, usually changing in shape as the wave advances. The shape of this wave front at any fixed point in the earth—the equal traveling time surface—is a non-spherical surface.

When an advancing wave front encounters a surface of discontinuity such as an underlying stratum of hard rock, refraction and reflection occur; the direction of propagation of the wave front changes and the wave may be split up into component waves traveling in different directions, each with its own wave front and equal travel time surfaces. Thus there are equal travel time surfaces for the direct wave from the source, for all the various refracted waves and for all the various reflected waves. The equal time surface for any given wave may be defined as the surface passing through the points in space for which the propagation time for the wave under consideration is the same. This definition holds equally well for waves due to impulse excitation, such as for instance those created by the explosion of a charge of dynamite, and for continuous waves produced by an oscillator.

In most cases in practice, the receiver receives waves coming in from many directions. The first wave recorded by the seismograph is the one having the shortest travel time from the source. Following the arrival of this wave there are received other waves which have traveled over paths of longer travel times. The occurrence of these waves, which are termed later arrivals, is due to the complex and irregular nature of the earth's structure; to reflections and refractions at interfaces of strata. The later arrivals come from all directions. They are so numerous and irregular that they may become greatly confused on the record; so much so that it is sometimes almost impossible to pick out those waves which are useful for purposes of analysis. The useful waves are generally among the later arrivals.

In the reflection method, which is the method in which the present invention finds its greatest utility, the wave which it is essential to record is that which after propagation from the source travels far down into the earth and is reflected to the receiver from a deep stratum. It is the achieved object of the present invention to provide means whereby this reflected wave is recorded, while other waves such as those propagated along the surface of the ground or reflected from shallow strata are nullified in detection. The system of the invention is applicable whether the disturbing wave comprises only a small band of frequencies or a wide range of frequencies, and is equally effective whatever the frequencies. The system is not frequency sensitive.

According to the invention two or more receiving elements are used. These are interconnected electrically in phase displacement; usually in phase opposition; and are so disposed in relation to each other and to the directions of propagation of the reflected waves and the disturbing waves that they receive the reflected wave one after the other at small intervals of time, whereas they receive the disturbing waves simultaneously. The reflected wave is thus recorded but the disturbing wave is canceled out by reason of the positioning and of the phase displacement of the receivers. In general, the relative position of the two detectors is such that they lie on the same equal travel time surface for the disturbing wave and on different equal travel time surfaces for the wave which it is desired to record.

The invention is best understood by consideration of illustrative diagrams. In the accompanying drawings I have shown diagrammatically the invention applied to seismological prospecting and specific embodiments of certain new apparatus organizations within the invention.

In the showings,

Fig. 1 is a diagram showing the invention as applied to the elimination of disturbing surface waves;

Fig. 2 is a diagram representing the vibratory motion of the earth in the neighborhood of the receivers;

Fig. 3 is a diagram representing the recording of a desired wave according to the invention;

Fig. 4 is a diagram representing the canceling out of an undesired wave;

Fig. 5 is a diagram of one form of apparatus organization showing the detector, phase shifting device and recorder connections;

Fig. 6 is a diagram similar to Fig. 1 showing the invention as applied to the elimination of shallow refracted waves; and Figs. 7, 8 and 9 are diagrammatic views showing three typical ways of positioning the detectors in the ground.

In the showings, Fig. 1 shows the invention applied to a typical reflection seismological method problem; determining the location of a deep high speed stratum 10 underlying fairly uniform crust strata indicated as a whole by 11. A source of seismic vibration 12, which may be a charge of dynamite or a vibrator, is set up in a shallow bore 13 at the surface. Waves are propagated therefrom in all directions. According to the invention a receiving station is set up at a suitable distance (determined by usual methods) from the source. The receiving station comprises two detectors 14 and 15, positioned in the earth one above the other as shown. The detectors may be buried in earth or suspended in liquid in bores in the earth. The detectors are connected in phase opposition and in series with a recorder 17 as shown. The recorder can be of any suitable type, and usually takes the form of a kind of oscillograph comprising an amplifier, a sensitive galvanometer, a camera and a timing device such as a tuning fork. The amplifier amplifies the output of the detectors and delivers current to the galvanometer which is adapted to direct a spot of light on sensitized paper in the camera so as to trace a wave-form record, representing the vibration of the earth as picked up by the detectors. The tuning fork is arranged for producing timing marks on the record.

In this example the detectors are placed in the ground separated by a distance S in a line normal to the path of the surface wave which it is desired to eliminate, and along, or approximately along, the line of propagation of the reflected wave which it is desired to receive. The reflected wave comes up, in most cases, approximately vertically. The reflected wave indicated by 20 is shown as coming from the source, being reflected from the deep stratum as shown and impinging on the detectors. Equal travel time surfaces for this wave are indicated as at 21 through detector 15 and 22 through detector 14.

The source, as stated, propagates waves in all directions. Some are sent along close to the ground and reach the detectors by paths indicated as at 23 and 24. In this example it is assumed that the ground is such that these surface waves reach the two detectors at the same time. The equal travel time surface for both paths through the detectors is indicated as at 25. These waves are usually stronger at the receiving point than the deep reflected wave and in ordinary methods are apt to obscure the reception of wave 20.

In this example the disturbing wave reaches the two detectors at practically the same instant, hence, the detectors being connected in phase opposition, the disturbing wave is not recorded. The responses of the detectors neutralize each other, so to speak; the detection of waves 23 and 24 cancel out, and the waves are not recorded. The reflected wave 20, however, is recorded, since it reaches detector 15 before it reaches detector 14. Detectors 14 and 15 lie on different travel time surfaces of the reflected wave.

The separation S of the two detectors determines the relative magnitude of response for the detection of the reflected wave. The separation can be adjusted, if desired, to provide maximum response, by making the distance S equal to an odd multiple of half-wave lengths of the reflected wave. For example, if the wave lengths of wave 20 is 22 feet, the detectors may be spaced 11 feet or 33 feet or 55 feet, etc. In this case the response of the two detectors reinforce each other to the maximum degree. The response of the two detectors for wave 20 will be greater than if only one detector were used, so long as their separation along the path of the reflected wave 20 lies between one-sixth and five-sixths of a wavelength or in general if the separation lies between $(6n+1)/6$ and $(6n+5)/6$ wavelengths of wave 20, where $n$ has all integral values 0, 1, 2, 3 etc. For a separation S less than one-sixth of a wavelength, the joint response will be less than that of a single detector. However, in the invention the absolute magnitude of the response of the detectors for the desired wave is of relatively little importance. The invention is directed to making the relative magnitude of the response of the desired wave to that of the undesired wave as high as possible. Accordingly it is not often necessary to adjust the separation S to secure reinforcement of response for the desired wave. The separation can even be less than one-sixth of the wavelength if it is inconvenient to make it any greater.

Figs. 2 to 4 illustrate diagrammatically the detection of the various waves. Fig. 2 is a diagrammatic representation of the vibration of the earth in the neighborhood of the detectors, due to an artificial seismic disturbance; the vertical axis representing movement and the horizontal axis representing time. Fig. 3 represents the way in which detectors 14 and 15 pick up the desired, reflected wave. The reflected wave reaches 15 a little before it reaches 14, the detectors being displaced a distance S, and 15 detects the wave opposite to the detection by 14. Accordingly, the two detectors record the algebraic sum of the two waves, this being indicated as the dotted curve 30. Fig. 4 illustrates the detection of undesired, horizontal waves, which reach the two detectors substantially at the same time; the displacement of the detectors along the line of propagation of the undesired waves being zero. When the detectors are connected in phase opposition as in the example of the method given in connection with Fig. 1; or are put in appropriate phase displacement as will be described post, the records of the two detectors cancel out. The reception of the horizontal waves is indicated by dotted line 31 of zero amplitude.

Fig. 5 is a diagram of a modified form of apparatus organization comprising detectors, phase shifting means and a recorder; and Fig. 6 is a diagram illustrating the application of this apparatus system to another specific geophysical prospecting problem. Referring to Fig. 5, two detectors 14 and 15 are shown connected together in phase opposition as indicated by arrows P and with a phase shifter indicated as a whole by 16. The phase shifter is shown as comprising three subcircuits each including a variable inductance 32, a variable resistance 33 and the resistance element 34 of a potentiometer having a variable connection 35. The variable connections 35 of two of the potentiometers lead directly to the recorder as at 36 and 37, as shown. The third potentiometer variable connection 35 is connected to one of the detector circuits as at 38, as shown. The phase shifting device shown has provision for three detectors. In case only two detectors are used, as in the ilustrated embodiments, one of the detector circuits is not used. In Fig. 5, the topmost detector circuit can be cut out as by providing a switch connection short circuiting the middle potentiometer variable connection 35 directly to the recorder at 36, the switch connection being indicated as at 40. The switch is shown closed, since only two detectors are shown in use. By varying the resistances 33 and inductances 32, the phase displacement of the oscillating output of the two detectors can be relatively varied. Other means for varying the phase displacement or for connecting the detectors in phase opposition may be used. The potentiometers allow the relative amplitudes of signals from the two detectors to be varied; for a purpose explained post.

Fig. 6 illustrates the invention applied to another seismological problem. Fig. 6 shows a receiving station set up in a region having a shallow high speed stratum 45 underlying the surface layers 11. Of the waves sent out by a source on the left (not shown) some are propagated along the surface; some are reflected from the deep stratum along directions 20, these being the desired waves; and some are refracted along the interface between stratum 45 and the surface layers, and reach the detectors along paths 46 and 47. In many cases these shallow refracted waves are stronger than the deep reflected wave and obscure the record. According to the invention, the two detectors 14 and 15 are connected in phase opposition and are spaced apart horizontally and vertically in such manner that the records of the refracted waves nullify each other. They are placed so as to lie approximately along an equal travel time surface of the shallow refracted waves, such surface being indicated at 48. The detectors being connected in phase opposition, then the vertical and horizontal spacing of the detectors is given by the relation $$S/H = \text{Cotangent } A = \sqrt{(V^2/v^2) - 1}$$

where S is the vertical spacing, H is the horizontal spacing, V is the velocity of the wave in the lower, high speed layer 45, $v$ is the velocity of the wave in the upper, low speed layer 11 and A is the angle which the refracted waves 46 and 47 make with the perpendicular. Under such conditions detectors 14 and 15 lie on the same equal travel time surface for the undesired refracted waves 46 and 47 and these waves reach the detectors at the same time. Since the detectors are connected in phase opposition, the corresponding signals of the two waves cancel out. On the other hand, the detectors being displaced vertically, and hence lying in different travel time surfaces for the deep reflected wave, this wave is recorded, as in the former case. The incoming direction of the deep reflected wave is indicated at 20, and the equal travel time surfaces for the reflected wave are shown as at 51 through detector 15 and 52 through detector 14. If desired the vertical separation can be made some odd multiple of a half-wavelength of the reflected wave, the horizontal separation being then determined by the relation given. This arrangement gives maximum response energy from the detectors, but as stated is rarely necessary. In this example it is the ratio S/H, rather than absolute magnitudes of S and H, which is important. In determining the ratio S/H in the field, it is merely necessary to know the velocities V and $v$; data which are always at hand in seismological prospecting work. In a specific example, V=6000 feet per second and $v$=2000 feet per second, then the proper ratio of S to H is equal to $$\sqrt{(V^2/v^2) - 1},$$

or 2.83:1. If S is made equal to 28.3 feet, then H is equal to 10 feet.

The detectors may be connected directly in phase opposition, no phase shifting device being employed; but it is sometimes more convenient to employ a phase shifter, for this allows of some variations in the ratio S/H. The difference in time paths can be taken care of by adjustment of the phase shifter. Fig. 6 shows a phase shifter 16 interposed between the detectors and the recorder.

In this example the critical adjustment is the correct ratio of horizontal to vertical displacement. This adjustment insures that the two detectors are so placed that the disturbing wave reaches them at the same time. This adjustment is independent of the frequency of the received waves. It is only necessary to have the vertical separation such that it is not an integral multiple of a wavelength at the principal frequency recorded in the reflected wave. As stated, if the vertical separation is an odd multiple of half a wavelength, the maximum amount of energy is received from the reflected wave. This is not necessary however for the desired functioning of the system. The selective properties of the system remain even if this condition is not fulfilled. In some cases in the field it is difficult or impossible to adjust the relative spacing of the detectors so that they lie exactly on the same equal travel time surface for the disturbing wave. One detector may receive the disturbing wave slightly before the other detector, for example. In this case the phase shifter can be employed to delay the response from the detector receiving the wave first, so that in the recorder the responses from the two detectors are made simultaneous, and nullify each other. Thus by employing a phase shifter in circuit as described, the latitude permissible in locating the detectors in the earth is greatly increased. Even if they are not located with strict geometrical accuracy, by adjustment of the phase shifter the defection of the detector arrangement from geometrically correct positions, can be compensated for.

In the foregoing examples it was assumed that uppermost layers 11 were uniform and homogeneous. Thus the wave form for the undesirable wave 46 received at detector 14 is the same as that for the undesirable wave 47 received at detector 15, and both will be recorded alike. In some cases, however, the superficial layers are not uniform. In this case it is desirable to locate the detectors in the earth in such positions that the received wave form is the same for each.

Figs. 7 to 9 illustrate three typical arrangements of the detectors. In the arrangement of Fig. 7, detector 14 is positioned on the surface of the ground and detector 15 is positioned in the bottom of a bore 60. This arrangement is suitable for use in uniform surface layers; for example in regions having a layer 62 of one kind of ground at the surface and a layer 63 of different character below. Fig. 8 illustrates one arrangement for use in non-uniform layers. Detectors 14 and 15 are suspended at different depths in a bore 60. The bore is filled with fluid material or earth 61, to insure effective wave-transmitting contact with the detectors. In some cases the fact that the detectors are immersed in the same medium aids in insuring that the same wave form is received by each. Fig. 9 shows an alternative arrangement; the two detectors are positioned at different depths in two different bores 60 and 62, detector 14 being buried below the irregular layers occurring just beneath the surface. The two detectors being in ground having the same wave-transmission characteristics, the wave form received by each detector is the same.

The potentiometer device is for the purpose of regulating the relative amplitudes of the signals given by the two detectors. In some cases the amplitude of the response or signal of one detector will be greater than that of the other, and by varying the relative amplitudes so that the input from each detector to the recorder is equal (and opposite), the records produced by the undesirable waves are canceled out.

In some cases it is advantageous to use three or more detectors, in order to secure greater reinforcement of the desired wave response and to further minimize the response of the undesired wave. The electrical connections for three detectors are shown in Fig. 5. The connections and the spacing for three or more detectors are similar to those explained for a two detector system. The detectors are positioned on the same equal travel time surface for the disturbing wave and on different equal travel time surfaces for the desired wave, and are connected in phase difference.

By suitably spacing the detectors and suitably regulating the phase difference of the response of the detectors, in the manner described, any undesirable waves coming in from any direction can be eliminated from the record. Seismographical records made according to the invention show up the reception of the desired wave clearly and accurately, the undesired waves being greatly minimized in or completely eliminated from the record.

What I claim is:—

1. An organization of apparatus elements for detecting and recording certain desired terrestrial wave vibrations while suppressing disturbing undesired wave vibrations, comprising a plurality of detector elements positioned in the ground in vertical displacement and so arranged that the disturbing wave reaches them substantially simultaneously, phase shifting means in connection with the detecting elements for varying the relative phase displacement of the output of the detecting elements and recording means electrically connected with the phase shifting means.

2. The organization of claim 1 wherein the detecting elements are displaced horizontally as well as vertically, so as to receive at substantially the same instant a disturbing wave coming upward through the earth at an angle with respect to horizontal.

3. The method of claim 2 wherein the points of detection are located in parts of the ground having similar wave transmitting characteristics so as to make the wave form received at each point of detection the same.

4. In geophysical prospecting methods wherein a source of terrestrial wave vibration is set up, waves of various frequencies are propagated therefrom into the earth and recorded part of which are shallow and pass roughly horizontally through the earth adjacent the surface and part of which reach the surface of the earth from deep strata at a large angle with respect to horizontal, the deep wave being of primary interest, the method of recording the deep wave and at the same time minimizing the shallow wave which comprises conjointly detecting the shallow wave and the deep wave by means of two electrical detectors positioned at points in the earth spaced vertically with respect to each other in such geometrical position that the shallow wave reaches the detectors approximately simultaneously and the deep wave reaches the detectors in spaced sequence, and establishing phase opposition between the outputs of the detectors, so that the shallow wave is canceled in the recording whatever its frequency while the deep wave is recorded by the combined indication of the detectors.

5. In geophysical prospecting methods wherein a source of terrestrial wave vibration is set up and waves of various frequencies are caused to be propagated therefrom into the earth, some of which pass through shallow underlying strata and reach the surface of the earth at relatively small angles with respect to horizontal and are not of interest, and others of which penetrate to deep strata, reach the surface of the earth at relatively great angles with respect to horizontal and are of interest, and said waves are received at a location spaced from the source, a method of recording such waves in such manner as to minimize the shallow wave, which comprises conjointly detecting the waves by means of two electrical detectors positioned at points spaced vertically and horizontally with respect to each other in the earth in such geometrical position that the undesired wave reaches the detectors approximately simultaneously and the deep wave reaches the detectors in spaced sequence, and establishing phase opposition between the outputs of the detectors, so that the shallow wave is canceled in the recording whatever may be its frequency while the deep wave is recorded by the combined indication of the detectors.

6. An organization of apparatus elements for detecting and recording certain desired terrestrial wave vibrations coming in one direction while suppressing disturbing undesired wave vibrations of all frequencies coming in another direction, comprising a plurality of detecting elements positioned in the ground in vertical displacement and lying in such a plane as to receive the disturbing wave approximately simultaneously, and connected electrically in phase opposition so as to respond to the desired waves and recording means electrically connected with the detectors.

7. A method of seismograph prospecting which comprises locating two electrical detectors in the earth at two points spaced from each other vertically and lying substantially on the same equal travel time surface for a disturbing wave to be generated which it is desired to eliminate but lying on different equal travel time surfaces for a wave to be generated which it is desired to record, establishing phase opposition between the outputs of the detectors, setting up, at a position in the earth spaced from said points, a source of terrestrial wave vibrations of various frequencies which pass through underlying strata, and recording the combined outputs of the detectors so that the disturbing wave is suppressed and the desired wave is recorded.

8. A method of seismograph prospecting which comprises locating a plurality of electrical detectors in the earth at a plurality of points spaced from each other vertically and lying substantially but not exactly upon the same equal travel time surface for a disturbing wave to be generated which it is desired to eliminate and also lying on different equal travel time surfaces for a wave to be generated which it is desired to record, so that the disturbing wave will be received at one of the spaced points slightly before it is received at another and the desired wave will be received in spaced sequence at the points, establishing and adjusting relative phase difference between the outputs of the detectors to delay the recording of the output of the detector at the point which will be first reached by the disturbing wave, so as to compensate for the discrepancy in the geometric location of said detecting points, setting up at a position in the earth spaced from said points a source of terrestrial wave vibrations of various frequencies, and recording the combined outputs of the detectors, so that the disturbing wave is minimized with respect to the desired wave whatever may be the frequencies of said waves.

9. Apparatus for detecting and recording certain desired terrestrial wave vibrations while suppressing disturbing undesired wave vibrations of a plurality of frequencies coming in another direction, said apparatus comprising recording means and two detecting elements connected electrically in phase opposition and connected to the recorder, the detecting elements being located in the ground both substantially upon the same equal travel time surface for a disturbing wave which it is desired to eliminate and lying on different equal travel time surfaces for the wave which it is desired to record, so that the desired wave is recorded and the undesired wave is suppressed.

LEO J. PETERS.

CERTIFICATE OF CORRECTION.

Patent No. 2,087,702.

July 20, 1937.

LEO J. PETERS.

It is hereby certified that error appears in the printed specification of the above numbered patent requiring correction as follows: Page 4, first column, lines 35 to 38 inclusive strike out the semicolon and words " ;for example in regions having a layer 62 of one kind of ground at the surface and a layer 63 of different character below" and insert the same after "layers" and before the period in line 39; and that the said Letters Patent should be read with this correction therein that the same may conform to the record of the case in the Patent Office.

Signed and sealed this 31st day of August, A. D. 1937.

Leslie Frazer
Acting Commissioner of Patents.

(Seal)